R. H. AVERY.
Improvement in Corn-Stalk Cutters.
No. 130,100.  Patented Aug. 6, 1872.
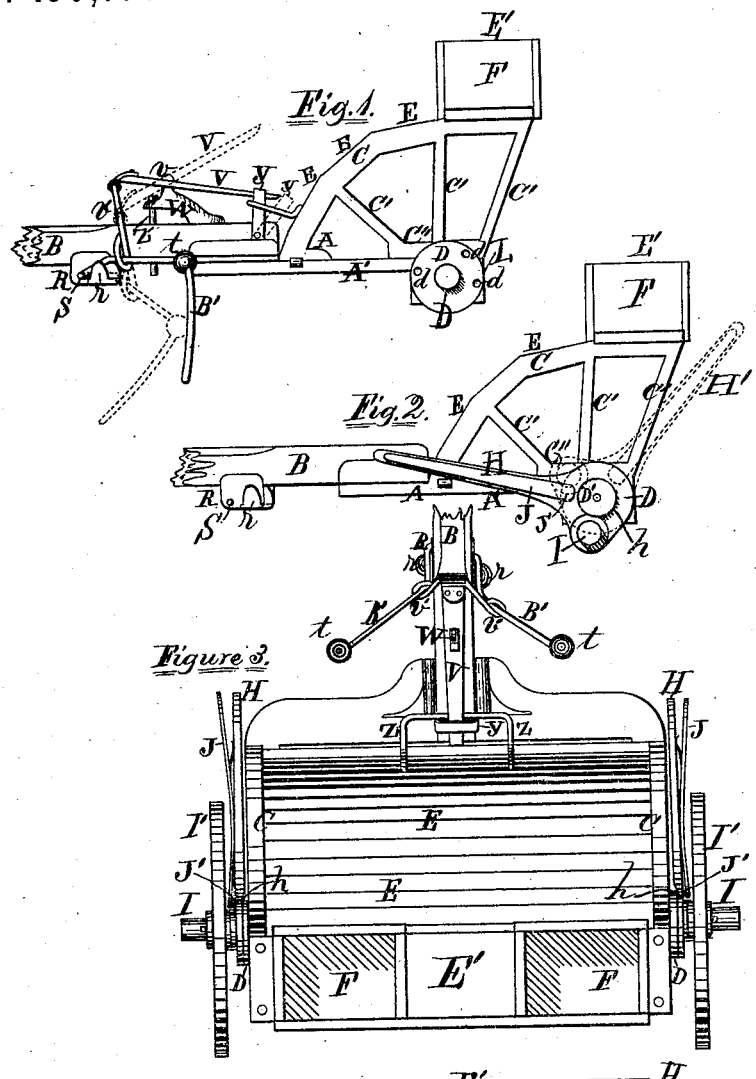
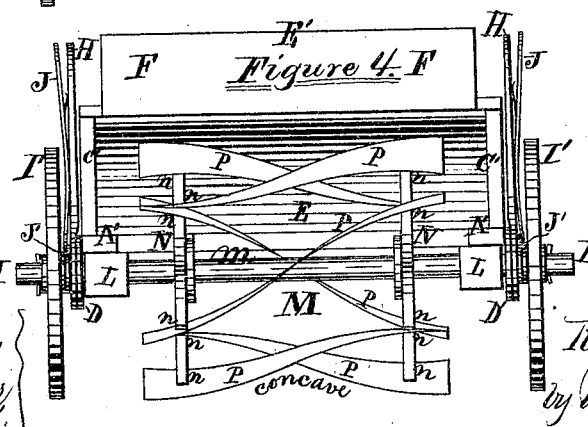

UNITED STATES PATENT OFFICE.

ROBERT H. AVERY, OF GALESBURG, ILLINOIS.

IMPROVEMENT IN CORN-STALK CUTTERS.

Specification forming part of Letters Patent No. 130,160, dated August 6, 1872.

Specification describing certain Improvements in Corn-Stalk-Cutting Machines, invented by ROBERT H. AVERY, of Galesburg, in the county of Knox and State of Illinois.

The first part of my invention relates to the manner of attaching the wheels to the frame and combining a lever therewith, by which the main frame and cylinder of cutters may be raised from the ground, all as hereinafter fully described. The second part of my invention relates to the construction of the cylinder of cutters and the arrangement of the cutters in spiral form, so as to present their cutting-edges to the soil in concave form, as hereinafter more fully set forth.

Figure 1 is a side elevation, with the cylinder of cutters, the wheels, and the devices for raising and lowering the frame removed. Fig. 2 is the same view as Fig. 1, with the levers for raising and lowering the wheels in place. Fig. 3 is a top view of my machine. Fig. 4 is a rear elevation.

The main frame of my machine consists of a transverse metallic bar, A, having ends A′ A′ projecting back. The transverse bar carries the draft-pole B, to which the ordinary drag-hooks B′ B′ may be attached. The ends A′ A′ support the side frames, consisting of curved bars C C, as shown at Figs. 1 and 2, supported by bars C′ C′ C′. The lower ends of each series of bars C′ C′ C′ are connected by a bar, C″, which rests on the rear end of a bar, A′. D is a circular disk or plate extending downward from the bar C″, and carrying a stud or cylindrical projection, D′, which serves as a journal for the levers H H, as hereinafter described. The curved bars C, supports C′ C′ C′, bar C″, and disk D are all cast in one piece. $d\ d\ d$ represent a series of holes in the disk D, of which there may be any desired number. E E E are boards or other covering extending across from one curved bar, C, to the other, and forming a covering for the cylinder of cutters and support for the driver's seat E′ and the boxes F F, in which may be placed stones or other heavy material to produce any desired weight on the cutters. H H are levers with disks or enlarged lower ends, pierced with holes $h$ in their lower ends on a line with the axis of the lever, which holes fit over the studs D′ as journals. I I are the wheel-spindles, projected from the lower ends of the levers H H and to one side of the holes $h$, as shown at Fig. 2. I′ I′ are the wheels. J J are springs, with studs J′ J′ on their lower ends, which pass through holes in the lower end of levers H H and engage with the holes $d$ in the disk D. The full lines H H at Fig. 2 show the position of the levers H when turned down and forward to elevate the frame and raise the cutters from the ground for convenience in transporting the machine from place to place, the levers H being held in this position by the studs J′ J′ passing through and into holes $d$. The dotted lines H′, Fig. 2, show the position of the levers when the frame and cylinder of cutters are lowered for work in the field. Of course the levers may be held at any intermediate position from those described by allowing the stud J′ to engage in different ones of the series of holes $d\ d\ d$, and the machine thus be adapted to cut deeper or shallower into the soil, as desired. L L are blocks attached one to the under side of each bar A A, and form the bearings for the journals on the end of the cylinder of cutters' shaft. M is the cylinder of cutters, consisting of a shaft, $m$, two heads, N, with radial arms $n\ n\ n\ n\ n\ n$ and cutters P P P P P P. The cutters are so curved and attached to the arms $n$ in such manner and position that their cutting-edges always present a concave surface to the soil, as shown plainly at Fig. 4, thus adapting the cutting-surface to fit partially over the ridges on which the stalks stand or lie. R represents a plate secured to the under side of the draft-pole B, with a lug, $r$, projecting outward and upward from each side. S S are holes pierced in the plate R. B′ B′ are the hooks for dragging the stalks into position for cutting, and are formed as shown, their forward ends inserted in the holes S S and resting, near their forward ends, in the lugs $r\ r$, in which position their rear ends may be raised as desired, or the hooks be removed simply by raising their rear ends and withdrawing them. $t\ t$ are weights on the hooks B′ B′ for the purpose of keeping them down at their rear ends. V is a lever, pivoted at $v$ on a standard, W, on the draft-pole B, and carrying at its forward end links $v'\ v'$, which encircle the hooks B′ B′, and which serve to elevate said hooks when the rear end of the lever V is depressed. Y is a stirrup, pivoted at its ends to the draft-pole B, and which may be turned up, as shown by full lines at Fig. 1, to hold the rear end of the lever V depressed; or may be turned back, as shown by dotted lines, to release the end of the lever V and allow the hooks B' B' to drop into working position. Z is a foot-rest, and Z' the bolt on which the ordinary double-tree is pivoted.

The operation is as follows: The driver occupies the seat E', and is protected from flying stalks, dirt, &c., by the covering E. If the machine is not heavy enough weights may be placed in the boxes F F. The spiral arrangement of the cutter-blades will prevent the jolting common to the ordinary cutter; and it is believed that they will cut better, as they strike the stalks diagonally when dragged into line by the hooks B' B', and only a portion of each blade is on the ground at one time.

By means of the levers H H the machine may be set to cut deeper or shallower, as desired, or be elevated entirely from the ground. The driver may operate the devices for raising and lowering the hooks B' B' with his feet.

Claims.

1. The disks D, levers H, and springs J, operating in combination with the frame A C C' and wheels I, substantially as and for the purpose set forth.

2. The cylinder M having curved cutters P, arranged spirally, as shown, so as to present their cutting-edges to the soil in concave form, as and for the purpose set forth.

ROBERT H. AVERY.

Witnesses:
PLATT R. RICHARDS,
M. H. BARRINGER.